Nov. 10, 1953

L. A. MEDLAR ET AL 2,658,591

THROTTLE CONTROL FOR AUTOMOTIVE VEHICLES

Filed March 9, 1950

INVENTORS
LEWIS A. MEDLAR &
GERARD A. NAAB
BY
*Busser + Harding*
ATTORNEYS.

Patented Nov. 10, 1953

2,658,591

UNITED STATES PATENT OFFICE 2,658,591

THROTTLE CONTROL FOR AUTOMOTIVE VEHICLES

Lewis A. Medlar, Oreland, and Gerard A. Naab, Philadelphia, Pa., assignors to James C. Boyle, Toledo, Ohio; Charles S. Thompson, administrator of said James C. Boyle, deceased, assignor to Charles S. Thompson, as trustee Application March 9, 1950, Serial No. 148,671

8 Claims. (Cl. 192—3)

This invention relates to a throttle control for automotive vehicles and particularly to a control for relieving fatigue during periods of extended operation at substantially constant speed or constant throttle adjustment.

In the past, passenger automobiles were generally provided not only with foot accelerators but with hand-operable throttle controls generally mounted on the steering column. The foot accelerator normally occupied a position closing the air intake throttle to a position to effect idling of the engine while increased speed or power of operation was achieved by pressing downwardly on the accelerator pedal. The hand throttle, on the other hand, could override the control by the accelerator pedal and could be placed in any desired position to maintain a particular speed or power output by fixing the position of the throttle valve. In such cases it was possible for the driver to relieve the position of his foot on the pedal by setting the hand throttle in a desired position, particularly for long straight runs. This, however, was still not entirely satisfactory since in the case of a sudden emergency if the driver merely tended to stop by operation of the brake pedal the engine would continue to generate a large amount of power and the engine would not be disconnected from the wheels except by simultaneous operation of the clutch pedal. Since most drivers tended to decelerate by pressing the brake pedal first and by only pressing the clutch pedal after the drag of the slowed-down engine would substantially aid the deceleration of the car the instinctive movements by the operator would not, in this case, tend to produce as rapid deceleration as an emergency might require.

In modern passenger cars the hand-operated throttle control has been eliminated, particularly because the hand-operated throttle control was seldom used even for the purpose indicated above since most drivers dislike the situation presented of maintaining the engine in high speed operation under conditions when rapid deceleration was desired. The elimination of the hand throttle control, however, leaves only the foot pedal for control and to maintain speed or power it is accordingly necessary that the foot of the driver be continuously pressed on the pedal.

The general object of the present invention is to provide an arrangement whereby for long periods of driving at constant speed or constant power the operator is enabled to remove his foot from the accelerator pedal but nevertheless without the disadvantage of having to fumble for a hand throttle control in order to slow down the engine when it is desired to decelerate. In the preferred form of the invention if the mechanism is set to maintain speed or power the instinctive operation of stepping on the brake pedal to decelerate will automatically effect a tripping operation so as to bring the engine immediately to idling condition. Alternatively, this same result may be secured by momentarily touching the accelerator pedal.

While the invention will be primarily directed to its use in passenger vehicles of the type not furnished with a hand throttle it will become evident that it is equally applicable to trucks in which additional hand throttle control may be present.

The foregoing general objects of the invention are attained by the means described in the application of James C. Boyle, Serial Number 79,777, filed March 5, 1949. However, in accordance with the disclosure of said application mechanical devices are used which must differ in form and construction depending upon the make of car or truck to which the invention is applied.

In accordance with the present invention there is provided an electromechanical device which is applicable generally to cars and trucks of all modern makes inasmuch as the sole mechanical connection involved is to the accelerator control rod which, though it may have various positions in different vehicles, is invariably present between the accelerator pedal and the throttle control valve. Except for a manually accessible switch the electrical connections are readily made to standard points of the electrical system of such vehicle.

The broader objects of the invention will be apparent from the foregoing. These and other objects particularly relating to details of construction and operation will become apparent from the following description read in conjunction with the accompanying drawing in which.

Figure 1:
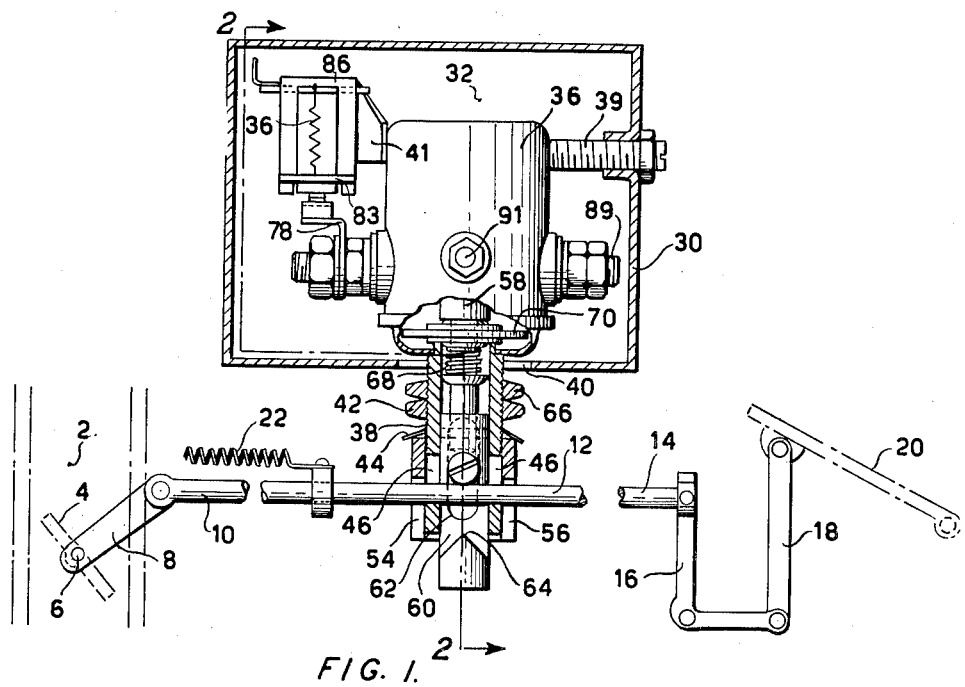
Figure 1 illustrates in section certain of the mechanical elements involved in accordance with the invention, certain conventional parts of the vehicle being diagrammatically illustrated.

Referring first particularly to Figure 1 there is indicated at 2 the conventional intake passage of a vehicle engine controlled by the throttle valve 4 which is pivoted at 6 and provided with an arm 8 having connections to the accelerator pedal 20. These connections may be, and generally are, indirect and are indicated as comprising a link 10, a rod 12, a link 14, a bell crank 16, and a link 18, the latter being pivoted to the accelerator pedal 20. If the connections are quite direct the links 10 and 14 may consist merely of continuations of the intermediate rod 12. In other cases, however, these links may be connected through suitable bell cranks to the rod 12. In any event, there will normally be in the accelerator connections an available rod such as indicated at 12 which, as viewed in Figure 1, is urged toward the left by a spring 22 acting directly or indirectly thereon. As is usual, such spring will normally tend to raise the accelerator pedal and will tend to close the throttle to an idling position determined by an adjusting screw or other stop. Still referring to Figure 1, the throttle valve 4 will be opened by a movement of the rod 12 against the action of spring 22 by depression of the accelerator pedal 20.

Figure 3:
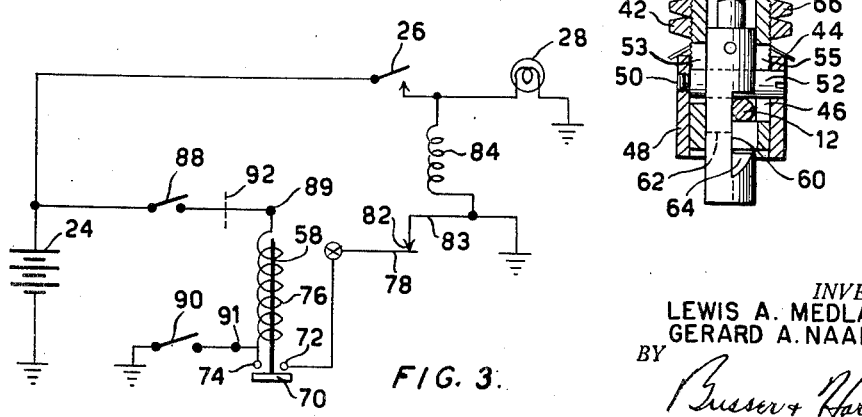
Figure 3 is a wiring diagram showing the electrical connections provided in accordance with the invention.

Before proceeding with a description of the new mechanical parts, reference may be made to Figure 3 which shows certain conventional electrical elements of the vehicle. These include the usual battery 24 (connected, of course, to the charging generator, not illustrated), the switch 26 arranged to be closed upon depression of the brake pedal of the vehicle, and the stop light 28 which is illuminated upon depression of the brake pedal and closure of switch 26 to give a warning signal at the rear of the vehicle.

Figure 2:
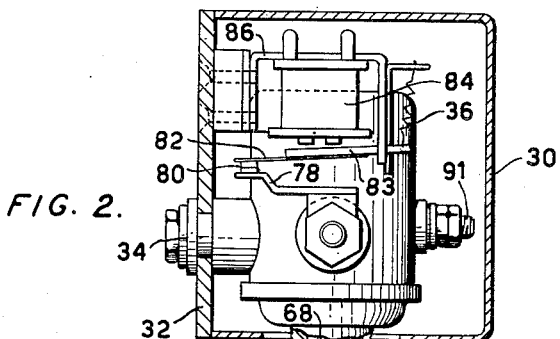
Figure 2 is a section taken on the broken surface, the trace of which is indicated at 2—2 in Figure 1.

The new mechanical elements which are provided in accordance with the invention are illustrated in Figures 1 and 2 and include a box 30 provided with a mounting plate 32, this box enclosing a relay and solenoid to protect the same from dirt or damage. Pivoted to the plate 32 at 34 there is a solenoid housing 36 provided with a lower tubular extension 38 projecting through an opening 40 in the bottom of the box 30. Clockwise movement of the housing 36 about its pivot 34 is limited by an adjustable screw 39 threaded into the box 30. A leaf spring 41 secured to the plate 32 normally urges the housing 36 clockwise into engagement with the screw 39.

The tubular extension 38 is externally threaded to receive a pair of nuts 42 located above a dished spring disc 44 which surrounds the extension 38. Near its lower end the extension 38 is provided with a transverse slot 46 through which there extends the rod 12. It will be understood that the plate 32 is mounted on the engine or some other portion of the vehicle which is fixed so that the assembly so far described is in a position to permit the rod 12 to pass freely through the slot 46 when the solenoid assembly is in the normal position illustrated.

Surrounding loosely the lower end of the extension 38 is a sleeve 48 located below the spring disc 44, into which sleeve 48 there is threaded at 50 a transverse pin 52 extending across the rod 12. Pin 52 projects through slots 53 and 55 in the extension 38 so that the sleeve 48 is free for vertical movement relative to the extension 38. The sleeve 48 is slotted at 54 and 56 for the passage of the rod 12.

The solenoid plunger 58 is provided with a stem 60 which is formed with an elongated slot 62 embracing the pin 52. This stem is also provided with a knife edge 64 which, as will appear hereafter, is adapted to rise to engage and grip the rod 12. A shoulder 66 on the stem has located above it a spring 68 above which there surrounds the stem a contact plate 70 adapted to engage a pair of contacts 72 and 74 which are not illustrated in Figure 1 but which are shown in the diagram constituting Figure 3. The solenoid is also not shown in Figure 1 but is indicated at 76 in Figure 3.

Supported by an insulated screw carried by the housing 36 is a contact arm 78 provided with a contact point 80 arranged to engage a similar contact 82 carried by the armature 83 of a conventional relay 84 which is secured to the plate 32 through elements including the bracket 86.

Referring now particularly to Figure 3 there is indicated at 88 a switch which may be the ignition switch of the vehicle and which will be closed when the vehicle is operating. This serves to connect the binding post 89 of the upper end of the solenoid with the ungrounded end of the battery 24. At 90 there is indicated a further switch which is grounded at one side and at its other side is connected to the binding post 91 electrically connected to the lower end of the solenoid 76 as viewed in Figure 3. The switch 90 preferably takes the form of a push button which may be mounted in a convenient position on the dash of the vehicle within easy reach of the operator. As will presently appear a momentary closure of this switch serves to put the device into operation.

The operation of the device so far described may now be detailed.

Under ordinary conditions when the device is not in operation the various mechanical parts will assume the positions indicated in Figures 1 and 2. The solenoid 76 will be deenergized with the result that the plunger 58 will be in lowered position and its stem will occupy a position in which the upper end of the slot 62 may engage the top of the pin 52 which, in turn, rests on the top of the rod 12, the rod 12, in turn, resting at the bottom of the slot 46 in extension 38. Under these conditions the spring disc 44 is slightly spaced from the lowermost nut 42 so as not to exert any substantial downward pressure on the sleeve 48 and pin 52. Accordingly the rod 12 is free to slide through the assembly and performs its normal function, being moved toward the right as illustrated in Figure 1 upon depression of the accelerator pedal and being drawn to the left by spring 22 when the pedal is released so as to give rise to normal control of the throttle valve 4.

Assuming now that the vehicle is running and consequently that the switch 88 is closed, it may be desired by the operator to locate the throttle valve 4 in some fixed position to maintain substantially constant the operation of the vehicle. To achieve such results it is only necessary that the operator press upon the accelerator pedal to secure the desired throttle valve setting and then momentarily close the switch 90 which, as stated, may be in the form of a push button switch mounted on the vehicle dash. As soon as the switch 90 is closed the accelerator pedal may be released since the operations which will now be described occur substantially instantaneously.

As will be evident from Figure 3, so long as the operator's foot is not on the brake the switch 26 will be open and consequently the relay 84 will be deenergized so that its armature 83 will be in lower position in engagement with the contact 80 carried by the arm 78. When the switch 90 is closed a circuit is completed through the solenoid 76 which will immediately raise the plunger 58 and close the circuit from the lower end of the solenoid through contact 74, plate 70, contact 72, arm 78, contact 80, contact 82 and armature 83 to ground. As will be evident, even though switch 90 is immediately released and opened a holding circuit is provided to maintain the solenoid 76 energized.

The mechanical action resulting from energization of solenoid 76 may be considered with reference to Figures 1 and 2. The rise of the plunger 58 brings the knife edge 64 into engagement with the rod 12, and since this rod, as is usual, is loosely mounted, the rod will be raised, raising in turn the pin 52 and sleeve 48 so as to force the spring disc 44 tightly into engagement with the lower nut 42 thus producing a cushioned reclamping action. It may be noted that the spring 68 will yield under these circumstances so that the upward movement of the plunger 58 will not be inhibited by engagement of contacts 72 and 74 by the contact disc 70. When now the accelerator pedal 20 is released, the biting action of the knife edge 64, which should be hardened, against the rod 12 will serve to hold the rod against the action of spring 22 since the clockwise movement of the solenoid housing is prevented by the stop screw 39. Since, as previously described, the solenoid, 76 will remain energized, this clamping action will continue and consequently the throttle valve 4 will be maintained in the position to which it was adjusted.

Assume now that after a period of operation with the throttle valve so locked in position the driver desires to resume normal control of the throttle. All that is necessary is a slight tap on the accelerator pedal. If the accelerator pedal is slightly depressed below the position in which it was previously locked, the rod 12 will be moved toward the right as indicated in Figure 1. Due to the clamping action of the knife edge 64 and the pin 52 such movement will result in a counterclockwise rocking of the solenoid housing against the action of spring 41. This will carry the contact arm 78 away from the armature 83 of relay 84 and as a result the solenoid circuit will be opened by disengagement of contacts 80 and 82. This will result in immediate release of the rod 12 with the result that normal operation of the throttle may be freely resumed. It may be noted that this will be the normally used operation for regaining pedal control of the throttle and is an operation which involves no more than the normal movement of the foot to depress the accelerator pedal.

Under emergency conditions the normal reaction of the driver is, of course, to depress the brake pedal. Such depression of the brake pedal will close the switch 26 for the usual operation of energizing the stop light 28. From Figure 3 it will be evident that closure of switch 26 will also energize the relay 84 lifting its armature 83 and effecting opening of the solenoid circuit at the contacts 80 and 82. Accordingly the accelerator rod will be released and snapped to idling position by the action of spring 22.

It will also be evident that the solenoid may be deenergized to release the rod 12 whenever the ignition switch 88 is opened. This, of course, insures that the solenoid is deenergized whenever the vehicle is parked. The use of the ignition switch to open the circuit may also be involved in an emergency if, for any reason, there should be a failure of closure of switch 26 when the brake pedal is depressed.

As will be evident from the foregoing the invention may be readily embodied in any make of car or truck through assembly with a convenient rod such as 12 of the elements carried by the plate 32 with provision of wiring into the usual electrical system of the vehicle with the sole addition of a push button switch to place the device in operation whenever desired.

There may be here noted an alternative possibility of rendering the device inoperative upon depression of the brake pedal. If there is associated with the brake pedal or its connections a switch located at the position indicated at 92 in Figure 3 which is normally closed but which is opened upon depression of the brake pedal it will be evident that the solenoid 76 will be deenergized without the necessity for providing the relay 84. Under such circumstances the contact 82 could be a fixed contact instead of being part of the relay armature. It is, however, preferred to provide an inexpensive relay such as indicated at 84 in order to avoid any complexity of wiring into the vehicle electrical system an unusual type of switch and making mechanical connections thereto.

It will be clear from the foregoing that numerous variations may be made in details of the mechanical and electrical arrangements described without departing from the scope of the invention as defined in the following claims.

What is claimed is:

1. In combination in an automotive vehicle, an accelerator element, a spring urging said element in a direction to decrease speed, releasable means for holding said element in adjusted position against movement under the action of said spring, said means including an electromagnetic clamping device effecting said holding when energized, and means for deenergizing said device, the electromagnetic clamping device being mounted for movement by movement of said element against the action of said spring when said device is energized, and the last mentioned means including contacts opened upon such movement of the clamping device.

2. In combination in an automotive vehicle, an accelerator element, a spring urging said element in a direction to decrease speed, releasable means for holding said element in adjusted position against movement under the action of said spring, said means including an electromagnetic clamping device effecting said holding when energized, and means for deenergizing said device, the electromagnetic clamping device being mounted for movement by movement of said element against the action of said spring when said device is energized, and the last mentioned means including contacts opened upon such movement of the clamping device, and additional switch means for effecting opening of said contacts.

3. In combination in an automotive vehicle, an accelerator element, a spring urging said element in a direction to decrease speed, releasable means for holding said element in adjusted position against movement under the action of said spring, said means including an electromagnetic clamping device effecting said holding when energized, and means for deenergizing said device, the electromagnetic clamping device being mounted for movement by movement of said element against the action of said spring when said device is energized, and the last mentioned means including contacts opened upon such movement of the clamping device, and additional switch and relay means for effecting opening of said contacts.

4. In combination in an automotive vehicle, an accelerator element, a spring urging said element in a direction to decrease speed, releasable means for holding said element in adjusted position against movement under the action of said spring, said means including an electromagnetic clamping device effecting said holding when energized, and means for deenergizing said device, the electromagnetic clamping device being mounted for movement by movement of said element against the action of said spring when said device is energized, and the last mentioned means including contacts opened upon such movement of the clamping device, and additional switch means for deenergizing said device.

5. In combination in an automotive vehicle, an accelerator element, a spring urging said element in a direction to decrease speed, releasable means for holding said element in adjusted position against movement under the action of said spring, said means including an electromagnetic clamping device effecting said holding when energized, and means for deenergizing said device, the electromagnetic clamping device being mounted for movement by movement of said element against the action of said spring when said device is energized, and the last mentioned means including contacts opened upon such movement of the clamping device, and additional switch and relay means for deenergizing said device.

6. In combination in an automotive vehicle, an accelerator element, a spring urging said element in a direction to decrease speed, releasable means for holding said element in adjusted position against movement under the action of said spring, said means including an electromagnetic clamping device effecting said holding when energized, and means for deenergizing said device, the electromagnetic clamping device being pivotally mounted for movement by movement of said element against the action of said spring when said device is energized, and the last mentioned means including contacts opened upon such movement of the clamping device.

7. In combination in an automotive vehicle, an accelerator element, a spring urging said element in a direction to decrease speed, releasable means for holding said element in adjusted position against movement under the action of said spring, said means including an electromagnetic clamping device effecting said holding when energized, means for momentarily energizing said device, said device including holding contacts maintaining it energized when momentarily energized by the last mentioned means, and means for deenergizing said device, the electromagnetic clamping device being mounted for movement by movement of said element against the action of said spring when said device is energized, and the last mentioned means including contacts opened upon such movement of the clamping device.

8. In combination in an automotive vehicle, an accelerator element, a spring urging said element in a direction to decrease speed, releasable means for holding said element in adjusted position against movement under the action of said spring, said means including an electromagnetic clamping device effecting said holding when energized, means for momentarily energizing said device, said device including holding contacts maintaining it energized when momentarily energized by the last mentioned means, and means for deenergizing said device, the electromagnetic clamping device being mounted for movement by movement of said element against the action of said spring when said device is energized, and the last mentioned means including contacts opened upon such movement of the clamping device, and additional switch means for effecting opening of said contacts.

LEWIS A. MEDLAR.
GERARD A. NAAB.

References Cited in the file of this patent
UNITED STATES PATENTS

| Number | Name | Date |
|---|---|---|
| 2,159,772 | Schroedter | May 23, 1939 |
| 2,270,002 | Glick | Jan. 13, 1942 |
| 2,423,006 | Chambers | June 24, 1947 |
| 2,467,485 | Krieg | Apr. 19, 1949 |
| 2,487,606 | Smith | Nov. 8, 1949 |
| 2,509,358 | Krieg | May 30, 1950 |
| 2,554,619 | Goik | May 29, 1951 |